United States Patent
Gibbs et al.

[15] 3,662,988
[45] May 16, 1972

[54] ANTI-REVERSE FLOW AND SYPHON BREAKER VALVE ASSEMBLY

[72] Inventors: John L. Gibbs, 14820 Miami Lakeway East; James W. Gibbs, 8027 West 14th Avenue, both of Hialeah, Fla. 33014

[22] Filed: June 8, 1970

[21] Appl. No.: 44,079

[52] U.S. Cl. ........................................................251/276
[51] Int. Cl. ......................................................F16k 31/50
[58] Field of Search ...............................251/274, 275, 276

[56] References Cited

UNITED STATES PATENTS

| | | |
|---|---|---|
| 1,541,757 | 6/1925 | Allen.....................................251/276 |
| 1,101,933 | 6/1914 | Hough..................................251/276 |
| 1,582,938 | 5/1926 | Smith................................251/276 X |
| 2,147,845 | 2/1939 | Kistner..................................251/276 |
| 2,773,664 | 12/1956 | Bowditch..............................251/276 |

FOREIGN PATENTS OR APPLICATIONS 21,747  10/1901  Great Britain.........................251/276

*Primary Examiner*—Henry T. Klinksiek
*Assistant Examiner*—David R. Matthews
*Attorney*—Salvatore G. Militana

[57] ABSTRACT

An anti-reverse flow and syphon breaker valve assembly as a replacement for the valve and valve stem assembly of the conventional bibcock, hose bibs and faucets having a pair of telescopically mounted valve stems, one valve stem having a bore forming a guide for the main valve stem and the bore receiving a relatively light coil spring yieldingly urging the main valve to seat on the valve seat whereby upon threading the main valve to its open position, the pressure of water slides the main valve against the spring pressure to its open position and upon loss of water pressure or upon creation of a syphon effect the main valve is brought to its closed position instantaneously to prevent a reverse flow of water.

1 Claim, 5 Drawing Figures

Patented May 16, 1972
3,662,988
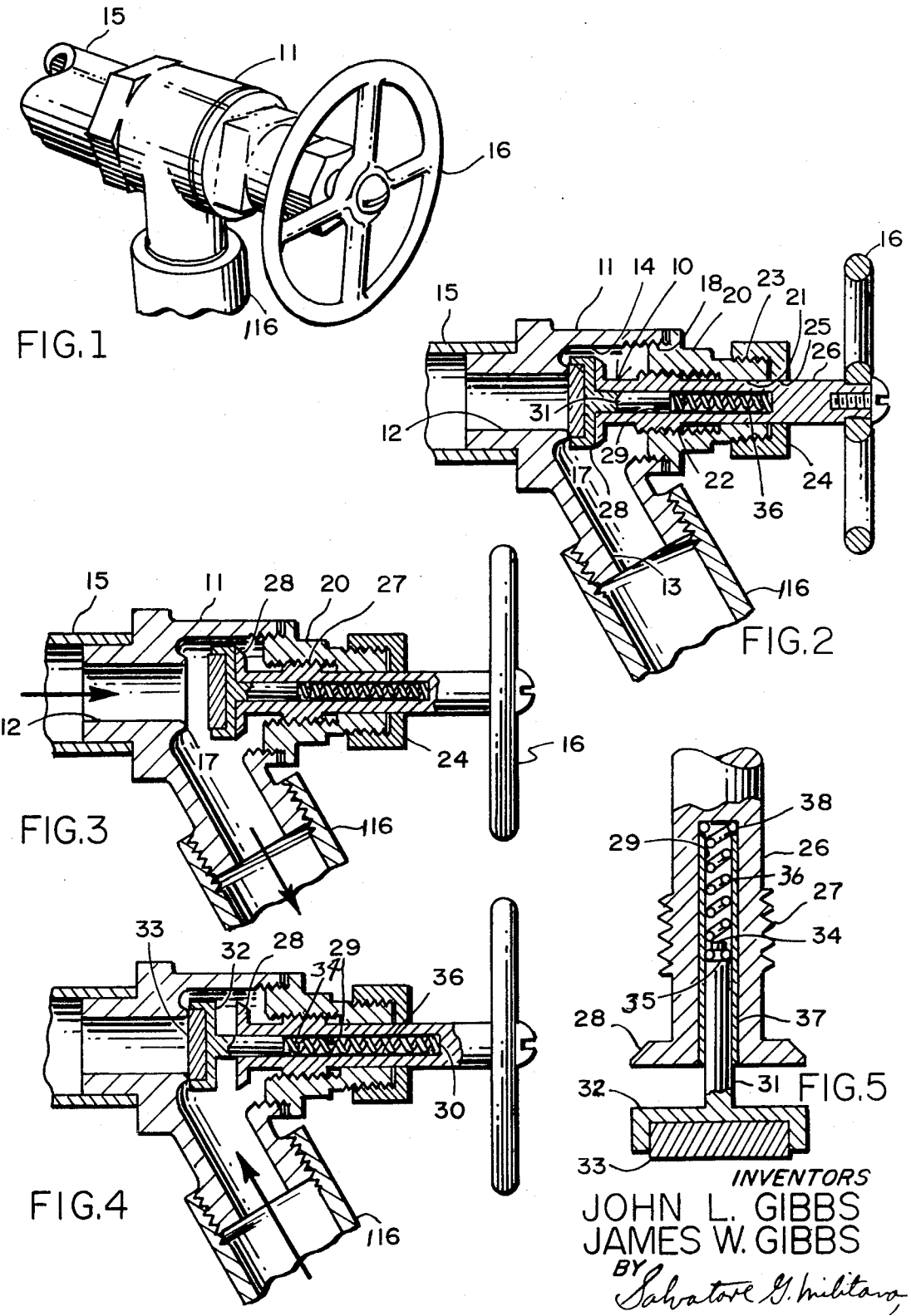

ANTI-REVERSE FLOW AND SYPHON BREAKER VALVE ASSEMBLY

This invention relates to fluid flow control devices and is more particularly directed to a valve assembly operating as a syphon breaker as well as preventing the reverse flow of fluid therethrough.

At the present time control valves which prevent the reverse flow of liquids such as water and the like are utilized in only those systems where the danger of contaminating the liquid at its source is imminent or highly likely to occur. The local ordinances usually define those situations wherein anti-reverse flow and syphon breaker valves must be used. However, due to the high cost of such a valve and complexity of design, a minimum of such valves are required by law. The present invention contemplates avoiding and does avoid the above objections to the conventional syphon breaker valve assemblies by providing a valve and valve stem assembly which incorporates structure rendering the latter anti-reverse flow and which assembly may be substituted for the valve and valve stem of a conventional bibcock, hose bib, pipe bib and faucets whereby all control valves wherein danger of contamination of source of supply by reverse flow exists may be readily replaced by the present invention.

Therefore, it is a principal object of the present invention to provide an anti-reverse flow and syphon breaker valve assembly which is simple in design, inexpensive in cost and which can be substituted for the valve and valve stem assembly of a conventional bibcock, faucet and the like.

Another object of the present invention is to provide an anti-reverse flow and syphon breaker valve assembly which offers no flow restriction in the normal flow of water therethrough and upon loss of pressure or upon creation of syphon effect the valve closes instantaneously to prevent contamination of the water at its source.

A further object of the present invention is to provide an anti-reverse flow and syphon breaker valve assembly with a pair of valve stems telescopically mounted wherein one valve stem forms a guide for the main valve stem and provides an enclosed space for a light coil spring to yieldingly urge the main valve to its seated position.

A still further object of the present invention is to provide an anti-reverse flow and syphon breaker valve assembly with a coil spring that is so positioned that it cannot bind nor become inoperative by accumulation of foreign matter.

With these and other objects in view, the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

In the drawing:

FIG. 1 is a perspective view of a bibcock incorporating our anti-reverse flow and syphon breaker valve assembly.

FIG. 2 is a longitudinal cross sectional view showing the valve assembly in the seated or closed posit-on.

FIG. 3 is a similar view showing the control valve in an open position permitting the flow of water therethrough.

FIG. 4 is a similar view showing the functioning of the valve assembly to close the main valve in preventing the reverse flow of water.

FIG. 5 is an alternate construction of the valve assembly.

Referring to the drawing wherein like numerals are used to designate similar parts throughout the several views, the numeral 10 refers to an anti-reverse flow and syphon breaker valve assembly constructed in accordance with our invention shown mounted in a hose bib 11 by way of illustration only as our valve assembly 10 may be used to control the flow of fluid, water and the like in any fluid distribution system wherein danger of contamination of the fluid at its source is present by a reverse flow of fluid in the system.

The hose bib 11 is provided with an inlet duct 12, an outlet duct 13 and a valve chamber 14 connecting the inlet 12 with the outlet. A pipe 15 connected to the hose bib 11 at the inlet duct 12 permits the flow of fluid from a source (not shown) past the valve assembly 10 when in an open condition to be discharged through the outlet 13 and discharge line 116 that is connected thereto.

The inner end portion of the inlet duct 12 terminates in a valve seat 17 while the valve chamber 14 is open as at 18 wherein internal threads are provided for threadedly receiving a plug 20. The plug 20 is provided with an axially disposed bore 21 whose inner end portion is threaded as at 22 and at the outer end portion external threads 23 are formed for receiving a cap 24. The cap 24 is provided with an axially disposed bore 25 through which extends a valve stem 26. External threads 27 formed on the valve stem 26 and in mesh engagement with the threads 22 permit axial movement of the valve stem 26 when actuated by a hand wheel 16 mounted on the free end of the valve stem 26. The valve stem 26 is provided with a valve stop 28 at its inner end and an axially disposed bore 29 which extends slightly less than the full length of the valve stem 26 terminating as at 30 a short distance from the outer end of the valve stem 26.

Slidably mounted in the bore 29 is a second valve stem 31 at whose outer end is a cup shaped valve 32 containing a fiber or plastic washer 33 that engages the valve seat 17 for controlling the flow of liquid therealong. The inner end 34 of the valve stem 31 is reduced in diameter and provided with a peripheral groove 35 for receiving and securing the end of a coil spring 36. The spring 36 extends between the end 30 of the bore 29 and the inner end of the valve stem 31 to provide the valve stem 31 with a relatively small yielding force that compels the valve 32 to slide in the direction of the valve seat 17.

In the normal use of my valve assembly, the pipe 15 is connected to a source of uncontaminated liquid while the pipe 116 is connected to a use for the liquid passing therethrough, which use may be a source of contamination. When the valve wheel 16 has been actuated to thread the stem 26 and valve stop 28 to their inner most position, the valve stop 28 will engage the valve 32, 33 which in turn is seated on the valve seat 17 to prevent any flow of water through the pipe bib 11 as shown by FIG. 2.

When the discharge of liquid through the pipe bib 11 is desired, the valve handle 16 is rotated to unthread the valve stem 26 outwardly of the housing plug 20 withdrawing the valve stop 28 from its position against the valve 32, 33. The pressure of the liquid in the pipe 15 will force the valve 32, 33 to slide away from the valve seat 17 against the spring pressure 36 to uncover the inlet port 12 and permit the discharge of liquid through the outlet 13 and pipe 116 as shown by FIG. 3. As long as there is pressure exerted by the liquid in the pipe 15, the valve 32, 33 will remain open, away from the valve seat 17 to permit liquid to be discharged at the outlet 13.

In the event of failure of liquid pressure at the inlet 12 or if there is a cut-off of liquid at its source, the spring pressure 36 will compel the immediate outward sliding movement of the valve 32, 33 in the direction of the valve seat 17 to become seated and prevent the return flow of liquid through the pipe 16 and outlet 13 which may have become contaminated. The sealing of the valve 32, 33 is almost instantaneous upon the drop in pressure of liquid at its source as indicated by FIG. 4. Also, in the event liquid is being directed to a destination that is elevated with relation to the source of liquid and either a drop in pressure occurs at the source or the pressure at the destination becomes greater than that at the source, the spring pressure 36 will cause an immediate seating of the valve 32, 33 to seal off the inlet 12 at the moment any back flow of liquid commences.

When dismantling the valve assembly 10 from the pipe bib 11, it is possible that difficulty may be experienced upon removing the valve stem 26 since the spring 36 is not secured at the inner end of the bore 25 except by frictional engagement of an enlarged turn at the end thereof. In this instance as the stem 26 is unthreaded and removed from the pipe bib 11, the valve 32, 33 and spring 36 may become disengaged from the valve stem 26 and remain in the hose bib 11 so that they have to be removed separately. To avoid this problem, as shown by FIG. 5, any non-corrosive or plastic sleeve 37 is slid into position in the bore 29 almost all the way, but leaving a space 38 at the inner end of the bore 29. Now the valve stem 31 with the coil spring 36 attached to the reduced end portion 34 is inserted within the nylon sleeve 37 until the enlarged turn at the end of the coil spring springs over the end of the sleeve 37 into the space 38 to secure the coil spring 36. Now when the stem 26 is inserted and removed from the pipe bib 11, the valve assembly 10 will remain fixed together as a unit.

From the above description taken in connection with the drawing, it is readily noted that our valve assembly 10 may be readily substituted for the valve assembly of a conventional bibcock, faucet and the like. All that need be done to convert the conventional bibcock is to remove the valve and valve stem assembly of the conventional bibcock and replace it with our valve assembly 10. The difference in costs between the conventional valve assembly and our valve assembly is very slight. Consequently the producers of the conventional bibcocks can manufacture our anti-reverse flow and syphon breaker valve assembly for little more than the conventional bibcock. Also, our valve assemblies 10 may be manufactured as a replacement for conventional valve assemblies so that all bibcocks, faucets, etc. may be converted even if there is only a slight chance of contamination of the water supply by a reverse flow thereof.

What we claim as new and desire to secure by Letters Patent of the United States is:

1. In an anti-reverse flow and syphon breaker valve assembly having a housing, an inlet and an outlet and an open valve chamber connecting said inlet and said outlet, a valve seat at said inlet, a plug threadedly mounted on said housing at said open valve chamber, the combination comprising a first valve stem threadedly mounted in said plug in substantial alignment with said valve seat, valve stop means mounted on one end of said first valve stem, said first valve stem having an axially disposed bore extending from said one end and terminating in proximity of said other end, a tubular member telescopically mounted in said bore and extending to a position spaced from said other end of said bore, a second valve stem slidably mounted in said tubular member, a valve mounted on one end of said second valve stem in alignment with said valve seat, spring means in said tubular member extending between the other end of said second valve stem and said other end of said bore, means securing said spring to said second valve stem at one end and said other end of said spring having an enlarged turn held between said other end of said bore and the inner end of said tubular member, said spring means yieldingly urging said valve in the direction of said valve seat.

* * * * *